(12) United States Patent
Kamiya

(10) Patent No.: US 7,665,351 B2
(45) Date of Patent: *Feb. 23, 2010

(54) AIR FLOW MEASURING DEVICE

(75) Inventor: Shinichi Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/121,004

(22) Filed: May 15, 2008

(65) Prior Publication Data

US 2008/0307869 A1    Dec. 18, 2008

(30) Foreign Application Priority Data

Jun. 14, 2007    (JP)    ............................. 2007-157392

(51) Int. Cl.
*G01M 15/00*    (2006.01)

(52) U.S. Cl. .................................... 73/114.32

(58) Field of Classification Search ............. 73/114.32, 73/114.34, 202, 202.5, 204.21
See application file for complete search history.

(56) References Cited

U.S. PATENT DOCUMENTS

| 5,099,686 | A | * | 3/1992 | Kohler ......................... 73/182 |
| 5,804,718 | A | * | 9/1998 | Nagasaka et al. ............. 73/202 |
| 5,847,275 | A | | 12/1998 | Kondo et al. |
| 6,079,264 | A | * | 6/2000 | Yamakawa et al. ........ 73/204.26 |
| 6,474,154 | B2 | * | 11/2002 | Kohmura et al. .............. 73/202 |
| 6,474,177 | B2 | * | 11/2002 | Maeda et al. ............. 73/861.63 |
| 6,526,822 | B1 | * | 3/2003 | Maeda et al. ............ 73/204.21 |
| 6,578,414 | B2 | * | 6/2003 | Kohmura et al. .............. 73/202 |
| 6,619,140 | B2 | * | 9/2003 | Kitahara et al. .......... 73/861.52 |
| 6,647,776 | B2 | * | 11/2003 | Kohmura et al. ......... 73/204.21 |
| 6,786,089 | B2 | * | 9/2004 | Goto et al. ............... 73/204.21 |
| 7,043,978 | B2 | * | 5/2006 | Goka et al. ................ 73/202.5 |
| 7,089,788 | B2 | * | 8/2006 | Yonezawa ................ 73/114.32 |

(Continued)

FOREIGN PATENT DOCUMENTS

JP    60-185118    9/1985

(Continued)

OTHER PUBLICATIONS

U.S. Appl. No. 12/120,882, Takashi Enomoto et al., filed May 15, 2008, (JP 2007-157314).

(Continued)

*Primary Examiner*—Lisa M Caputo
*Assistant Examiner*—Freddie Kirkland, III
(74) *Attorney, Agent, or Firm*—Nixon & Vanderhye P.C.

(57) ABSTRACT

An air flow measuring device includes a flow amount sensor for measuring a flow amount of air in a duct, and a tube body for defining a bypass passage in the duct. An upstream end surface of the tube body has an inlet of the bypass passage, and a downstream end surface thereof has an outlet of the bypass passage. An outer diameter of an outer peripheral surface of the tube body has a smallest dimension at the upstream end surface, and a largest dimension at the downstream end surface. Furthermore, the outer peripheral surface of the tube body has an upstream portion extending downstream from the upstream end surface in a predetermined range, and the upstream portion of the outer peripheral surface is a convex curve surface in which the outer diameter is increased by a ratio from the upstream end surface toward downstream.

11 Claims, 6 Drawing Sheets

U.S. PATENT DOCUMENTS

| | | | |
|---|---|---|---|
| 7,194,920 B2* | 3/2007 | Welker | 73/861.65 |
| 7,389,686 B2* | 6/2008 | Thomas et al. | 73/170.02 |
| 2002/0023485 A1* | 2/2002 | Kohmura et al. | 73/202 |
| 2002/0129648 A1* | 9/2002 | Kohmura et al. | 73/202.5 |
| 2003/0182998 A1* | 10/2003 | Goto et al. | 73/204.21 |
| 2008/0307867 A1* | 12/2008 | Enomoto et al. | 73/114.32 |
| 2008/0307868 A1* | 12/2008 | Kitahara | 73/114.32 |
| 2008/0307869 A1* | 12/2008 | Kamiya | 73/114.32 |

FOREIGN PATENT DOCUMENTS

| | | |
|---|---|---|
| JP | 06-307906 | 11/1994 |
| JP | 8-297039 | 11/1996 |
| JP | 9-287991 | 11/1997 |
| JP | 2005-128038 | 5/2005 |
| JP | 2006-047272 | 2/2006 |

OTHER PUBLICATIONS

U.S. Appl. No. 12/120,981, Noboru Kitahara, filed May 15, 2008, (JP 2007-157362).

Japanese Office Action dated Mar. 3, 2009, issued in corresponding Japanese Application No. 2007-157392, with English translation.

Japanese Office Action dated Oct. 27, 2009, issued in corresponding Japanese Application No. 2007-157392, with English translation.

* cited by examiner

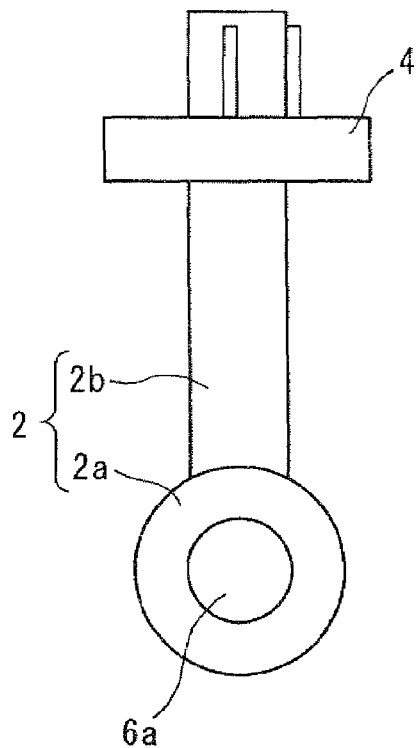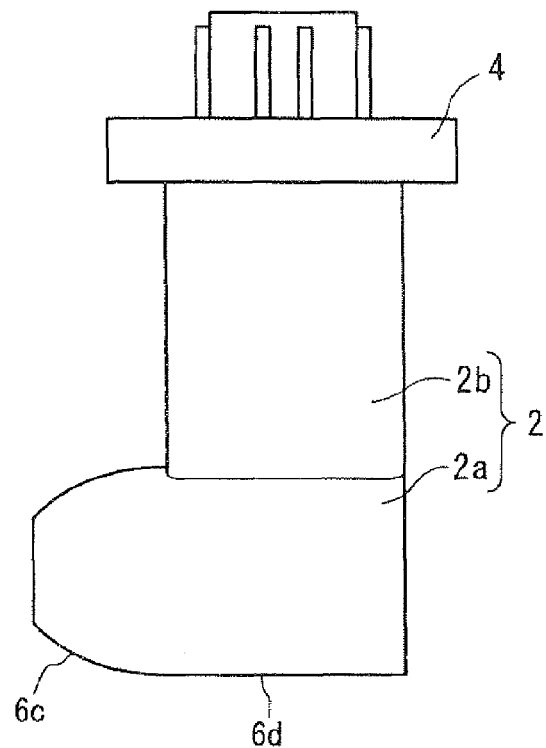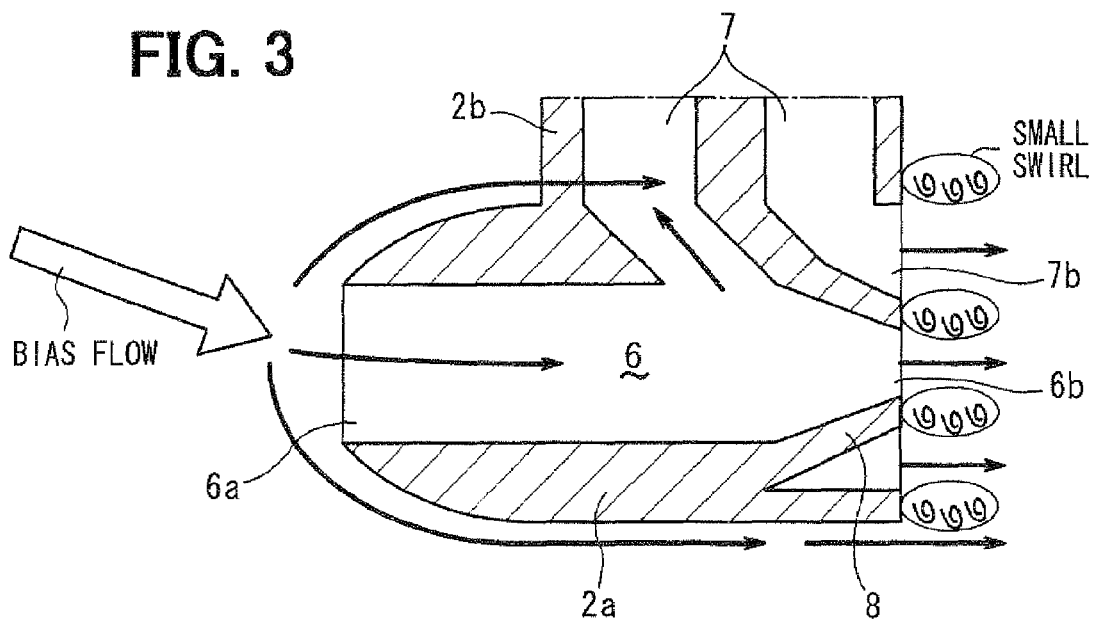

AIR FLOW MEASURING DEVICE

CROSS REFERENCE TO RELATED APPLICATION

This application is based on Japanese Patent Application No. 2007-157392 filed on Jun. 14, 2007, the contents of which are incorporated herein by reference in its entirety.

BACKGROUND OF THE INVENTION

1. Field of the Invention

The present invention relates to an air flow measuring device for measuring a flow amount of air flowing in a duct.

2. Description of the Related Art

An air flow measuring device described in U.S. Pat. No. 5,804,718 (corresponding to JP 9-287991A) is provided for measuring a flow amount of intake air flowing into an internal combustion engine. As shown in FIG. 7, the air flow measuring device includes a sensor body 110 disposed in an intake air passage 100 of the internal combustion engine. The sensor body 110 is provided with a bypass passage 120 into which a part of air flowing in the intake air passage 100 is introduced, and a communication hole 130 through which an inlet side of the bypass passage 120 and an outlet side of the bypass passage 120 communicate with each other. A flow amount sensor 140 is located in the bypass passage 120 to measure the flow amount of air flowing into the interior of the bypass passage 120.

However, in the flow amount measuring device, the flow amount sensor 140 may be difficult to accurately detect the flow amount of air due to dispersion, disturbance or/and variation of an air flow from an air cleaner that is located upstream of the intake passage 100. That is, when a bias flow shown in FIG. 7 is caused at an upstream side of the sensor body 110 due to an air disturbance or the like, a separation of an airflow is caused around the sensor body 110 and near the outlet side of the bypass passage 120. In this case, a large swirl of the air flow may be caused around the sensor body 110 and near the outlet side of the bypass passage 120, as shown in FIG. 7. Because of the large swirl of the air flow, a pressure difference between the inlet side and the outlet side of the bypass passage 120 is greatly varied, and thereby a flow speed of air flowing in the bypass passage 120 becomes unstable. As a result, a variation in output of the flow amount sensor 140 becomes larger, and thereby detection accuracy of the flow amount sensor 140 is deteriorated.

SUMMARY OF THE INVENTION

In view of the foregoing problems, it is an object of the present invention to provide an air flow measuring device, which can improve detection accuracy of a flow amount sensor.

It is another object of the present invention to provide an air flow measuring device, which can restrict a separation of an air flow from a tube body so as to improve detection accuracy of a flow amount sensor.

According to an aspect of the present invention, an air flow measuring device for measuring a flow amount of air flowing in an interior of a duct includes a tube body for defining a bypass passage configured to introduce therein a part of air flowing in the duct, a sub-bypass passage branched from the bypass passage and being configured to introduce therein a part of air flowing in the bypass passage, and a flow amount sensor located in the sub-bypass passage to measure a flow amount of air flowing in the sub-bypass passage. In the air flow measuring device, an upstream end surface of the tube body has an inlet of the bypass passage, open toward upstream in the duct, and a downstream end surface of the tube body has an outlet of the bypass passage, open toward downstream in the duct. The tube body has an outer peripheral surface extending from the upstream end surface to the downstream end surface, and an outer diameter of the outer peripheral surface of the tube body has a smallest dimension at the upstream end surface and a largest dimension at the downstream end surface. Furthermore, the outer peripheral surface of the tube body has a first portion extending downstream from the upstream end surface in a predetermined range, and the first portion of the outer peripheral surface is a convex curve surface in which the outer diameter is increased by a ratio from a position on the upstream end surface toward downstream. Because the first portion of the tube body is constructed of the convex curve surface, the pressure resistance of air on the tube body can be made small, thereby restricting a large disturbance of air flowing along the outer peripheral surface of the tube body and restricting a separation of air flow from the tube body. As a result, a flow speed of air flowing in the bypass passage can be made stable without greatly changing a pressure difference between the inlet and outlet of the bypass passage. Accordingly, in the air flow measuring device, detection accuracy of the flow amount sensor can be improved.

For example, the outer peripheral surface of the tube body has a second portion extending from a downstream end of the first portion to the downstream end surface of the tube body. In this case, the second portion of the outer peripheral surface may have a taper shape in which the outer diameter is increased approximately by a constant ratio toward downstream. Alternatively, the second portion of the outer peripheral surface may have a cylindrical shape in which the outer diameter is substantially equal.

According to another aspect of the present invention, an air flow measuring device for measuring a flow amount of air flowing in an interior of a duct includes a tube body for defining a bypass passage configured to introduce therein a part of air flowing in the duct, a sub-bypass passage branched from the bypass passage and being configured to introduce therein a part of air flowing in the bypass passage, and a flow amount sensor located in the sub-bypass passage to measure a flow amount of air flowing in the sub-bypass passage. In the air flow measuring device, an upstream end surface of the tube body has an inlet of the bypass passage, open toward upstream in the duct, and a downstream end surface of the tube body has an outlet of the bypass passage, open toward downstream in the duct. The tube body has an outer peripheral surface extending from the upstream end surface to the downstream end surface. Furthermore, an outer diameter of the outer peripheral surface of the tube body has a smallest dimension at the upstream end surface and a largest dimension at the downstream end surface, and the outer peripheral surface of the tube body has a convex curve surface in which the outer diameter is increased by a ratio from a position on the upstream end surface to a position on the downstream end surface. Accordingly, the pressure resistance of air on the tube body can be made small, thereby restricting a large disturbance of air flowing along the outer peripheral surface of the tube body and restricting a separation of air flow from the tube body. As a result, a flow speed of air flowing in the bypass passage can be made stable without greatly changing a pressure difference between the inlet and outlet of the bypass passage. Therefore, in the air flow measuring device, detection accuracy of the flow amount sensor can be improved.

According to another aspect of the present invention, an air flow measuring device for measuring a flow amount of air flowing in an interior of a duct includes a tube body for defining a bypass passage configured to introduce therein a part of air flowing in the duct, and a flow amount sensor located in the bypass passage to measure a flow amount of air flowing in the bypass passage. In the air flow measuring device, an upstream end surface of the tube body has an inlet of the bypass passage, open toward upstream in the duct, and a downstream end surface of the tube body has an outlet of the bypass passage, open toward downstream in the duct. The tube body has an outer peripheral surface extending from the upstream end surface to the downstream end surface, and an outer diameter of the outer peripheral surface of the tube body has a smallest dimension at the upstream end surface and a largest dimension at the downstream end surface. In addition, the outer peripheral surface of the tube body has a first portion extending downstream from the upstream end surface in a predetermined range, and the first portion of the outer peripheral surface is a convex curve surface in which the outer diameter is increased by a ratio from a position on the upstream end surface, toward downstream. Accordingly, the pressure resistance of air on the tube body can be made small, thereby restricting a large disturbance of air flowing along the outer peripheral surface of the tube body and restricting a separation of air flow from the tube body. As a result, a flow speed of air flowing in the bypass passage can be made stable without greatly changing a pressure difference between the inlet and outlet of the bypass passage. Therefore, in the air flow measuring device, detection accuracy of the flow amount sensor can be improved.

For example, the outer peripheral surface of the tube body may have a second portion extending from a downstream end of the first portion to the downstream end surface of the tube body. In this case, the second portion of the outer peripheral surface may have a taper shape in which the outer diameter is increased approximately by a constant ratio as toward downstream, or the second portion of the outer peripheral surface has a cylindrical shape in which the outer diameter is substantially equal.

According to further another aspect of the present invention, an air flow measuring device for measuring a flow amount of air flowing in an interior of a duct includes a tube body for defining a bypass passage configured to introduce therein a part of air flowing in the duct, and a flow amount sensor located in the bypass passage to measure a flow amount of air flowing in the bypass passage. In the air flow measuring device, an upstream end surface of the tube body has an inlet of the bypass passage, open toward upstream in the duct, and a downstream end surface of the tube body has an outlet of the bypass passage, open toward downstream in the duct. The tube body has an outer peripheral surface extending from the upstream end surface to the downstream end surface, and an outer diameter of the outer peripheral surface of the tube body has a smallest dimension at the upstream end surface, and a largest dimension at the downstream end surface. Furthermore, the outer peripheral surface of the tube body has a convex curve surface in which the outer diameter is increased by a ratio from the upstream end surface to the downstream end surface. Accordingly, in the air flow measuring device, detection accuracy of the flow amount sensor can be improved.

For example, in the above any air flow measuring device, the duct may be configured to define therein an intake air passage communicating with an intake air port of an internal combustion engine, such that the air flowing in the duct flows into the internal combustion engine In this case, the air flowing measuring device can be used as an air flow meter for measuring an air amount to be drawn into the internal combustion engine.

BRIEF DESCRIPTION OF THE DRAWINGS

Additional objects and advantages of the present invention will be more readily apparent from the following detailed description of preferred embodiments when taken together with the accompanying drawings. In which:

FIG. 2A is a front view showing the air flow measuring device, and FIG. 2B is a side view of the air flow measuring device, according to the first embodiment;

FIG. 3 is a cross sectional view showing a tube body of the air flow measuring device according to the first embodiment;

DETAILED DESCRIPTION OF THE PREFERRED EMBODIMENTS

Figure 1:
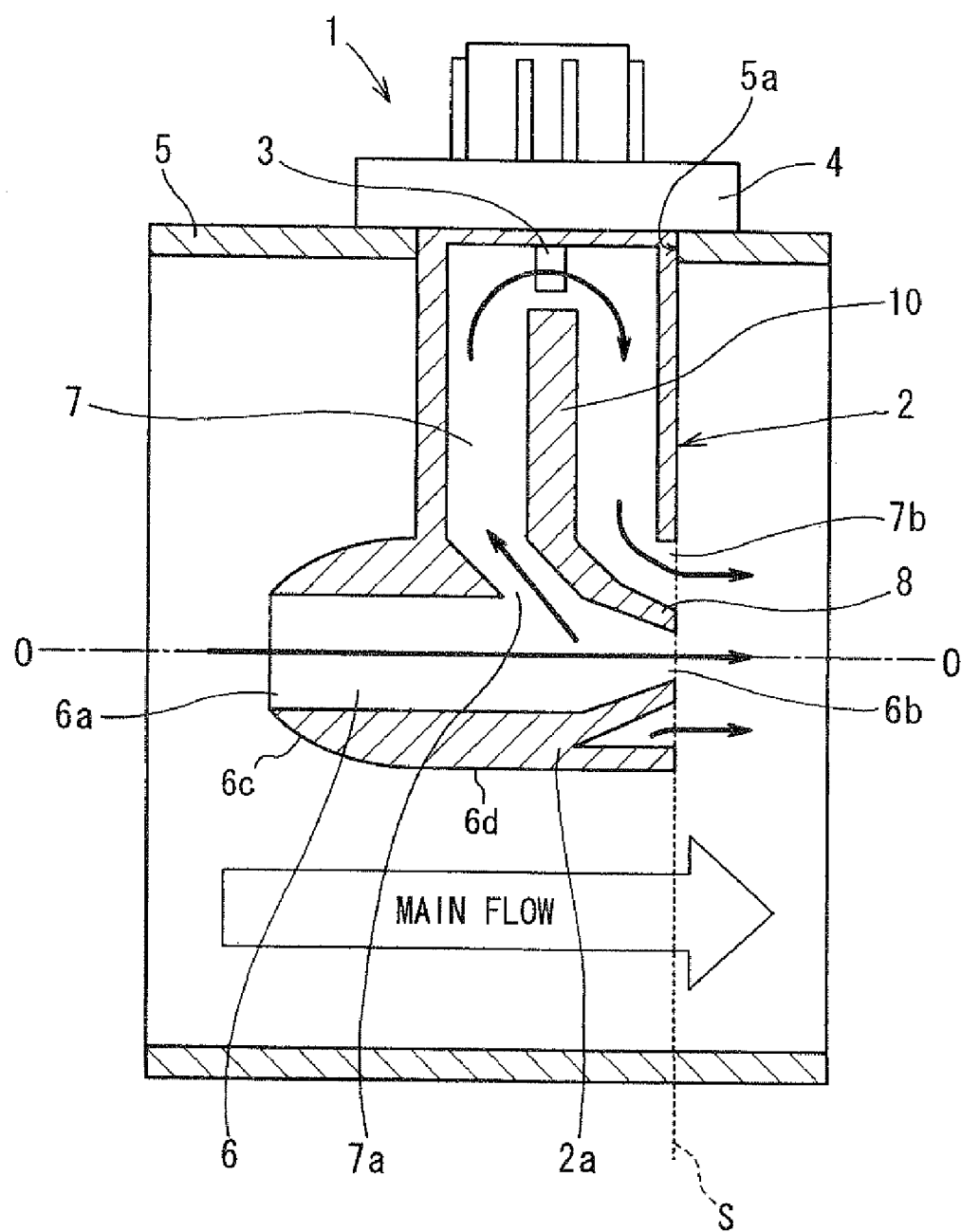
FIG. 1 is a cross sectional view showing an air flow measuring device according to a first embodiment of the present invention.

An air flow measuring device 1 of a first embodiment will be now described with referent to FIG. 1. For example, the air flow measuring device 1 can be suitably used as an air flow meter for measuring a flow amount of intake air in an internal combustion engine for a vehicle. The air flow measuring device 1 includes a sensor body 2, a flow amount sensor 3 and a circuit module 4.

The sensor body 2 is inserted into an interior of an intake air duct 5 of the engine. Air flows into an intake air port of the engine through the intake air duct 5. The intake air duct 5 has an attachment hole portion 5a into which the sensor body 2 is fitted after the sensor body 2 is inserted into the interior of the intake air duct 5. The sensor body 2 includes a tube body 2a having approximately a cylindrical shape, and a rectangular box-shaped body 2b provided integrally with the tube body 2a. The tube body 2a is provided with a bypass passage 6 into which a part of air flowing in the intake air duct 5 is introduced, and the rectangular box-shaped body 2b is provided with a sub-bypass passage 7 into which a part of air flowing in the bypass passage 6 is introduced.

In the example of FIG. 1, air flows through the intake air duct 5 from the left side toward the right side. The bypass passage 6 has an inlet 6a that is open toward an upstream air side (i.e., left side in FIG. 1) of the intake air duct 5, and an outlet 6b that is open toward a downstream air side (i.e., right side in FIG. 1) of the intake air duct 5. The bypass passage 6 is formed to extend approximately in a straight line from the inlet 6a to the outlet 6b along the flow direction of air in the intake air duct 5. Furthermore, an outlet side of the bypass passage 6a is provided with a throttle portion 8 (i.e., passage-area reducing portion) in which a passage sectional area of the bypass passage 6 is gradually reduced as toward the outlet 6b of the bypass passage 6.

The sub-bypass passage 7 has an inlet 7a branched from the bypass passage 6, and an outlet 7b opened toward the downstream air side of the intake air duct 5 at a position adjacent to the outlet 6b of the bypass passage 6. The outlet 7b is formed into approximately a circular shape around the outlet 6b of the bypass passage 6. For example, the outlet 7b is formed concentrically with the outlet 6b of the bypass passage 6 on the same surface where the outlet 6b of the bypass passage 6 is open. A partition wall 10 is located in the sensor body 2 so that the sub-bypass passage 7 is formed to be approximately U-turned from the inlet 7a to the outlet 7b. In this embodiment, the flow direction of air flowing into the inlet 7a is turned substantially by 180° in the sub-bypass passage 7 at one end side opposite to the inlet 7a and the outlet 7b. The partition wall 10 is spaced from the inner wall of the sensor body 2 to form a turning portion at the one end side opposite to the inlet 7a and the outlet 7b.

The flow amount sensor 3 measures and detects a flow amount of air flowing through the sub-bypass passage 7, and outputs the detected flow amount as an electrical signal (e.g., electrical voltage signal) For example, the flow amount sensor 3 includes a temperature sensing element and a heat generating element formed on a surface of a semiconductor substrate by a thin film resistor (not shown). The heat generating element and the temperature sensing element are connected to a circuit substrate (not shown) located inside the circuit module 4. As an example, the flow amount sensor 3 is located at the U-turning portion of the sub-bypass passage 7, as shown in FIG. 1.

The circuit module 4A is formed integrally with the sensor body 2, and is located outside of the intake air duct 5. The circuit module 4 controls an electrical current value applied to the heat generating element so that a difference between the temperature of the heat generating element and air temperature detected by the temperature sensing element becomes constant.

Next, the tube body 2a for defining therein the bypass passage 6 according to the first embodiment will be described. The outer peripheral surface of the tube body 2a has a first portion 6c extending from the upstream end surface of the tube body 2a toward downstream in a predetermined range. The first portion 6c is formed into a convex curve surface, and the inlet 6a of the bypass passage 6 is open at an upstream tip end of the first portion 6c. Specifically, an outer diameter of the first portion 6c constructed of the convex curve surface is enlarged toward downward by a predetermined ratio from a periphery of the inlet 6a of the bypass passage 6. Furthermore, the outer periphery surface of the tube body 2a has a second portion 6d extending from the downstream end of the first portion 6c to the downstream end surface of the tube body 2a, where the outlet 6b of the bypass passage 6 is provided. The second portion 6d is formed into a cylindrical shape having approximately the same outer diameter The tube body 2a has the largest outer diameter at its downstream end surface where the outlet 6b of the bypass passage 6 is open, and the smallest outer diameter at its upstream end surface where the inlet 6a of the bypass passage 6 is open. However, in this embodiment, a chamfer or a curvature may be provided in a wall portion of an outer peripheral corner of the tube body 2a.

As shown in FIG. 1, the downstream end surface of the tube body 2a is positioned substantially on a surface S that is approximately perpendicular to the axial line 0-0 of the intake air duct 5. Furthermore, the outlet 6b of the bypass passage 6 and the outlet 7b of the sub-bypass passage 7 may be open on the same surface S. For example, the outlet 7b is provided around the outlet 6b concentrically with the outlet 6b on the same surface S.

Next, operation of the air flow measuring device 1 will be described.

When air flows in the intake air duct 5 when operation of the engine is started, a part of air in the intake air duct 5 is introduced into the bypass passage 6 of the sensor body 2, and a part of air flowing in the bypass passage 6 is introduced into the sub-bypass passage 7. The flow amount sensor 3 located in the sub-bypass passage 7 is set such that the heat radiating amount of the heat generating element of the flow amount sensor 3 becomes larger as the flow speed of air flowing in the sub-bypass passage 7 becomes larger. Therefore, in the flow amount sensor 3, the electrical current value applied to the heat generating element is made larger as the flow speed of air in the sub-bypass passage 7 becomes larger, so that the temperature difference between the temperature of the heat generating element and the air temperature detected by the temperature sensing element becomes constant In contrast, when the flow amount of air flowing in the sub-bypass passage 7 becomes smaller, the heat radiating amount of the heat generating element is decreased, thereby the electrical current value applied to the heat generating element becomes smaller. An electrical signal (e.g., electrical current signal) corresponding to the electrical current value applied to the heat generating element is output from the circuit module 4 to an exterior ECU (i.e., electronic control unit) so that the flow amount of the intake air is measured by the ECU.

In the air flow measuring device 1 of the embodiment, the tube body 2a for defining the bypass passage 6 is formed into a cap shape such as a bullet shape with a low air flow resistance. That is, as shown in FIGS. 2A and 2B, the first portion 6c (upstream end portion) of the tube body 2a is formed into a convex curve surface, and the other portion (second portion 6d) positioned from the downstream end of the first portion 6c to the downstream end surface of the tube body 2a has substantially a cylindrical outer peripheral shape. Because the tube body 2a has the above shape, flow resistance of air on the tube body 2a can be made smaller.

According to the first embodiment of the present invention, the air flow measuring device 1 for measuring the flow amount of air flowing in the interior of the duct 5 includes the tube body 2a for defining the bypass passage 6 configured to introduce therein a part of air flowing in the duct 5, the sub-bypass passage 7 branched from the bypass passage 6 and being configured to introduce therein a part of air flowing in the bypass passage 6, and the flow amount sensor 3 located in the sub-bypass passage 7 to measure a flow amount of air flowing in the sub-bypass passage 7. In the air flow measuring device 1, the upstream end surface of the tube body 2a has the inlet 6a of the bypass passage 6, open toward upstream in the duct 5, and the downstream end surface of the tube body 2a has the outlet 6b of the bypass passage 6, open toward downstream in the duct 5. The tube body 2a has an outer peripheral surface extending from the upstream end surface to the downstream end surface, the outer diameter of the outer peripheral surface of the tube body 2a has the smallest dimension at the upstream end surface, and the largest dimension at the downstream end surface. Furthermore, the outer peripheral surface of the tube body 2a has the first portion 6c extending downstream from the upstream end surface of the tube body 2a in a predetermined range, and the first portion 6c of the outer peripheral surface is a convex curve surface in which the outer diameter of the tube body 2a is increased by a ratio from a position on the upstream end surface toward downstream.

According to the first embodiment, even when a bias flow is caused due to the air disturbance on the upstream side of the tube body 2a, a large disturbance is not caused in the flow of air flowing along the outer peripheral surface of the tube body 2a, thereby effectively restricting a separation of the air flow. Therefore, a pressure difference between the inlet side and the outlet side of the bypass passage 6 can be made stable. As a result, a variation in a flow speed of air flowing in the bypass passage 6 or in a flow speed of air flowing in the sub-bypass passage 7 can be reduced.

Furthermore, in the first embodiment, the tube body 2a is provided with the throttle portion 8 having a taper shape at a downstream side of the inlet 7a in a flow direction of air in the bypass passage 6. The throttle portion 8 having the taper shape has a passage sectional area in the bypass passage 6, which is gradually reduced as toward downstream. Therefore, the flow speed of air flowing out of the outlet 6b of the bypass passage 6 becomes fast, and thereby suction force (negative pressure) is generated at the outlet 7b of the sub-bypass passage 7 formed around the outlet 6b of the bypass passage 6. Furthermore, because the flow speed of main air flowing outside of the tube body 2a becomes faster by Venturi effect, the suction force applied to the outlet 7b of the sub-bypass passage 7 becomes larger.

As a result, the flow speed of air flowing in the sub-bypass passage 7 becomes faster and more stable, thereby improving the detection accuracy of the flow amount sensor 3.

Second Embodiment

Figure 4:
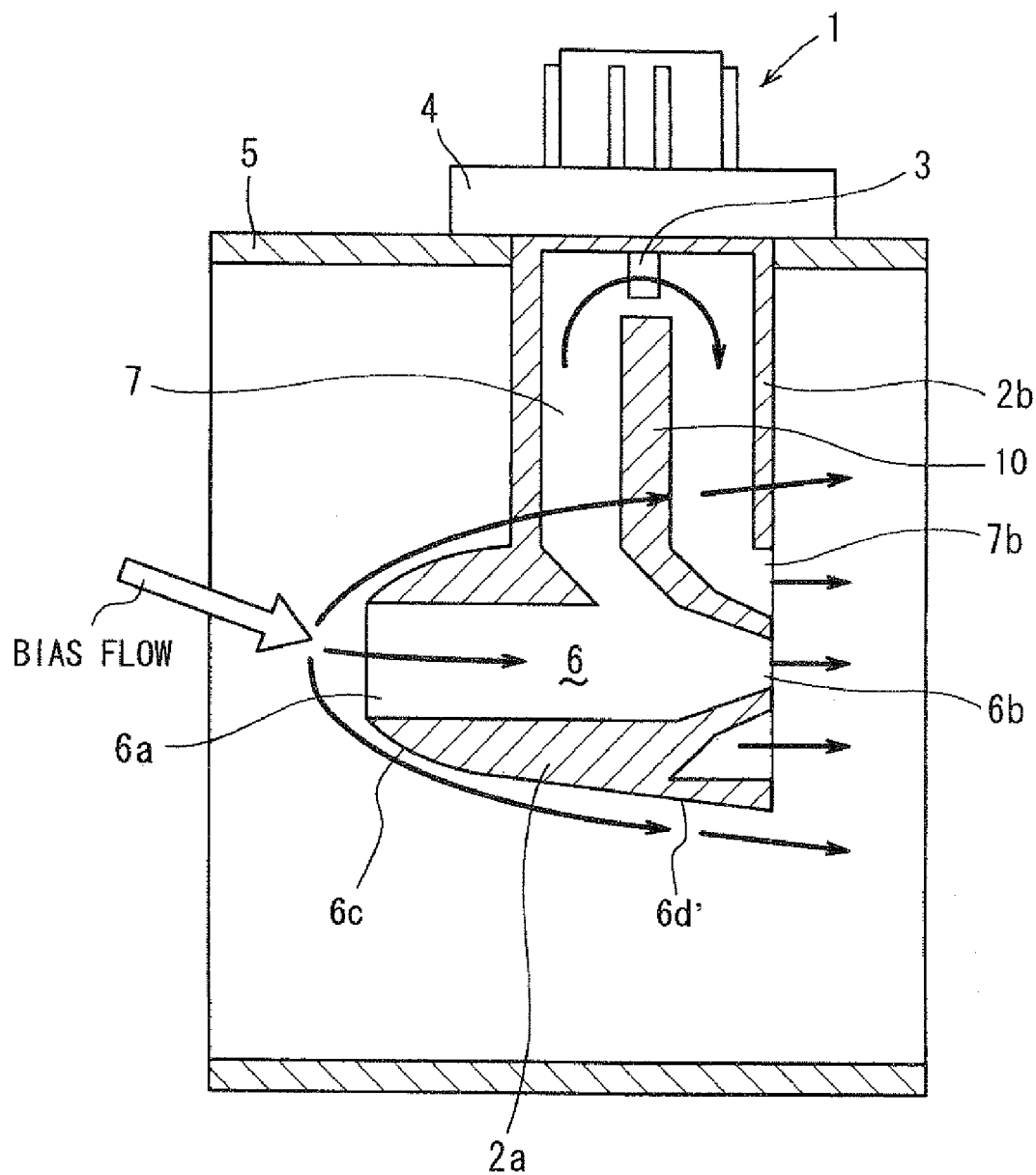
FIG. 4 is a cross sectional view showing an example of an air flow measuring device according to a second embodiment of the present invention.
Figure 5:
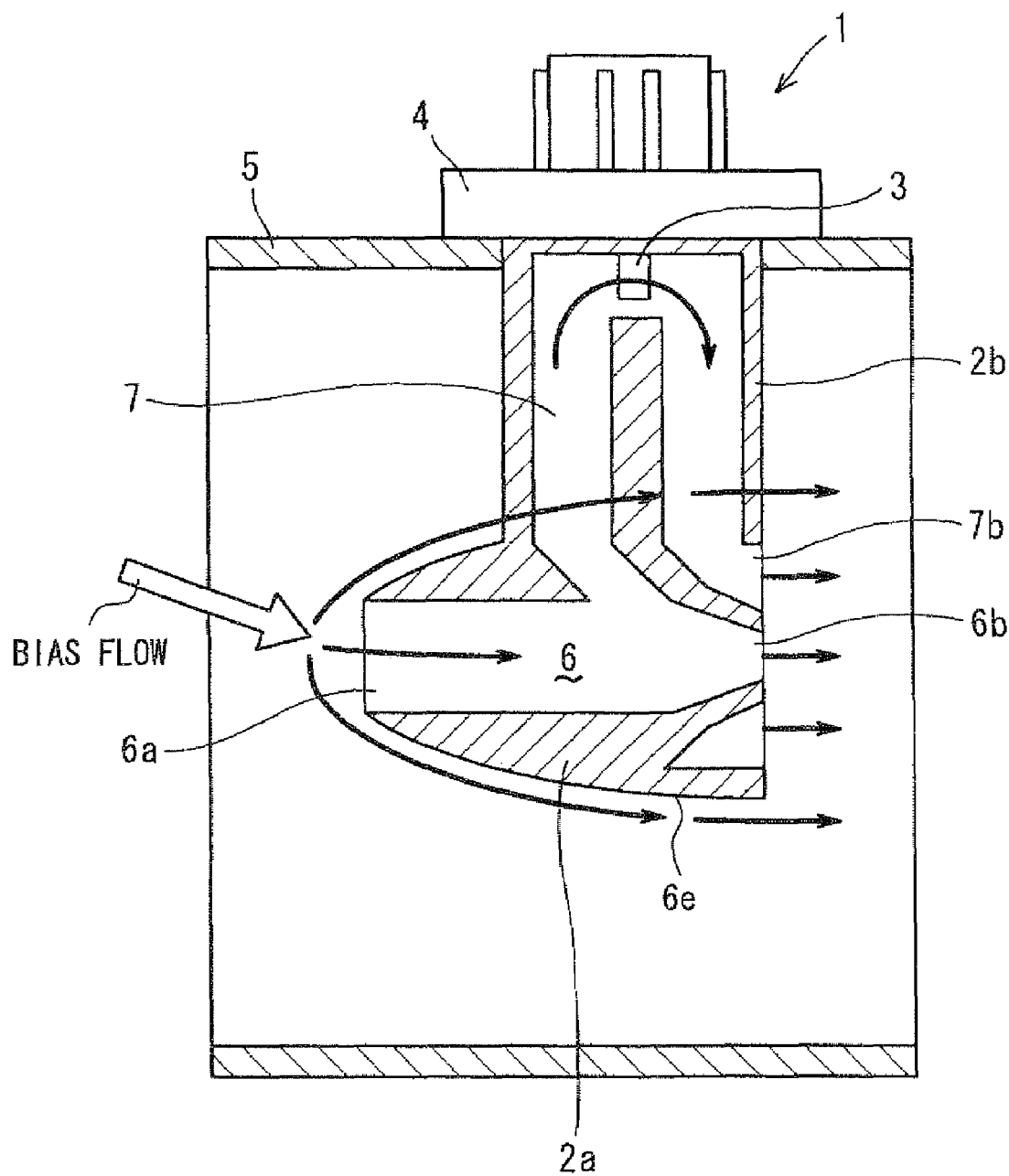
FIG. 5 is a cross sectional view showing another example of an air flow measuring device according to the second embodiment.

FIG. 4 shows an example of an air flow measuring device 1 of the second embodiment, and FIG. 5 is another example of an air flow measuring device 1 of the second embodiment. In the example of FIG. 4 of the second embodiment, a second portion 6d' (downstream portion) of the tube body 2a, downstream from the first portion 6c (upstream portion), is formed into a taper shape in which the outer diameter of the tube body 2a becomes gradually larger as toward downstream.

In the example shown in FIG. 4 of the second embodiment, the first portion 6c is formed to have a convex curve surface in which the outer diameter is increased as toward downstream by a predetermined ratio from the periphery of the inlet 6a of the bypass passage 6, and the second portion 6d' of the tube body 2a other than the first portion 6c is formed into a taper shape in which the outer diameter of the tube body 2a is increased toward downstream by a ratio. That is, in the example shown in FIG. 4, the outer peripheral surface of the tube body 2a includes the first portion 6c having the inlet 6a at its upstream end, and the second portion 6d' positioned downstream from the first portion 6c and having the outlet 6b at its downstream end. The first portion 6c has the convex curve surface in which the outer diameter is increased as toward downstream by a predetermined ratio from the periphery of the inlet 6a of the bypass passage 6. Furthermore, the second portion 6d' of the tube body 2a is formed into a taper shape in which the outer diameter of the tube body 2a is increased as toward downstream by a ratio.

In the example of FIG. 5, an entire outer peripheral surface 6e of the tube body 2a is configured to have a convex curve surface in which the outer diameter of the tube body 2a is gradually increased from the upstream end surface to the downstream end surface of the tube body 2a. Therefore, in the example of FIG. 5, the outer diameter of the tube body 2a, at its downstream end surface where the outlet 6b of the bypass passage 6 is open, becomes largest. For example, the entire outer peripheral surface of the tube body 2a may be formed into a convex curve surface in which the outer diameter is increased approximately by a constant ratio entirely from the upstream end surface of the tube body 2a to the downstream end surface thereof.

In the second embodiment, the other parts of the flow amount measuring device 1 are similar to those of the above-described first embodiment. Thus, the flow speed of air flowing in the sub-bypass passage 7 can be made faster and stable, and detection accuracy of the flow amount sensor 3 can be improved, similarly to the above-described first embodiment.

Third Embodiment

Figure 6A:
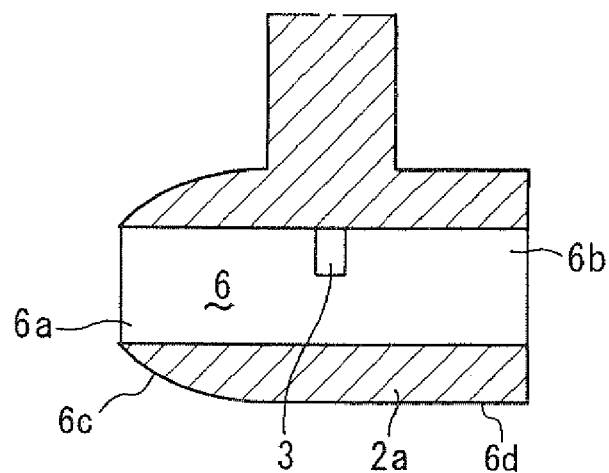
FIGS. 6A to 6C are sectional views showing various examples of tube bodies for an air flow measuring device according to a third embodiment of the present invention.
Figure 6B:
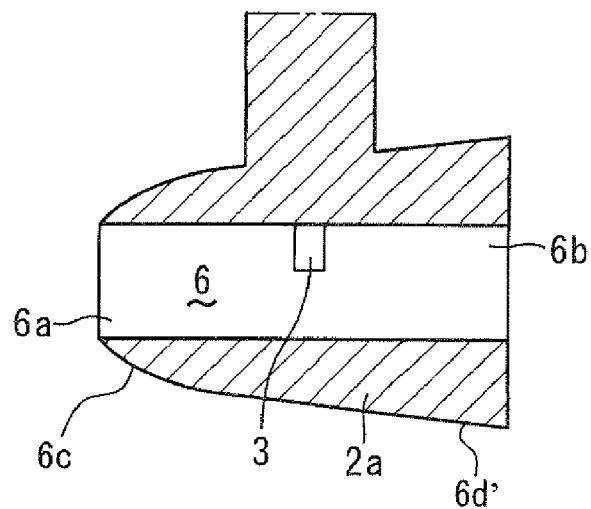
Figure 6C:
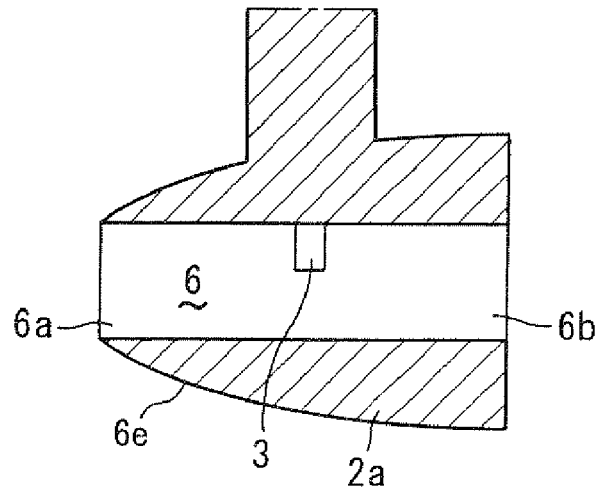
Figure 7:
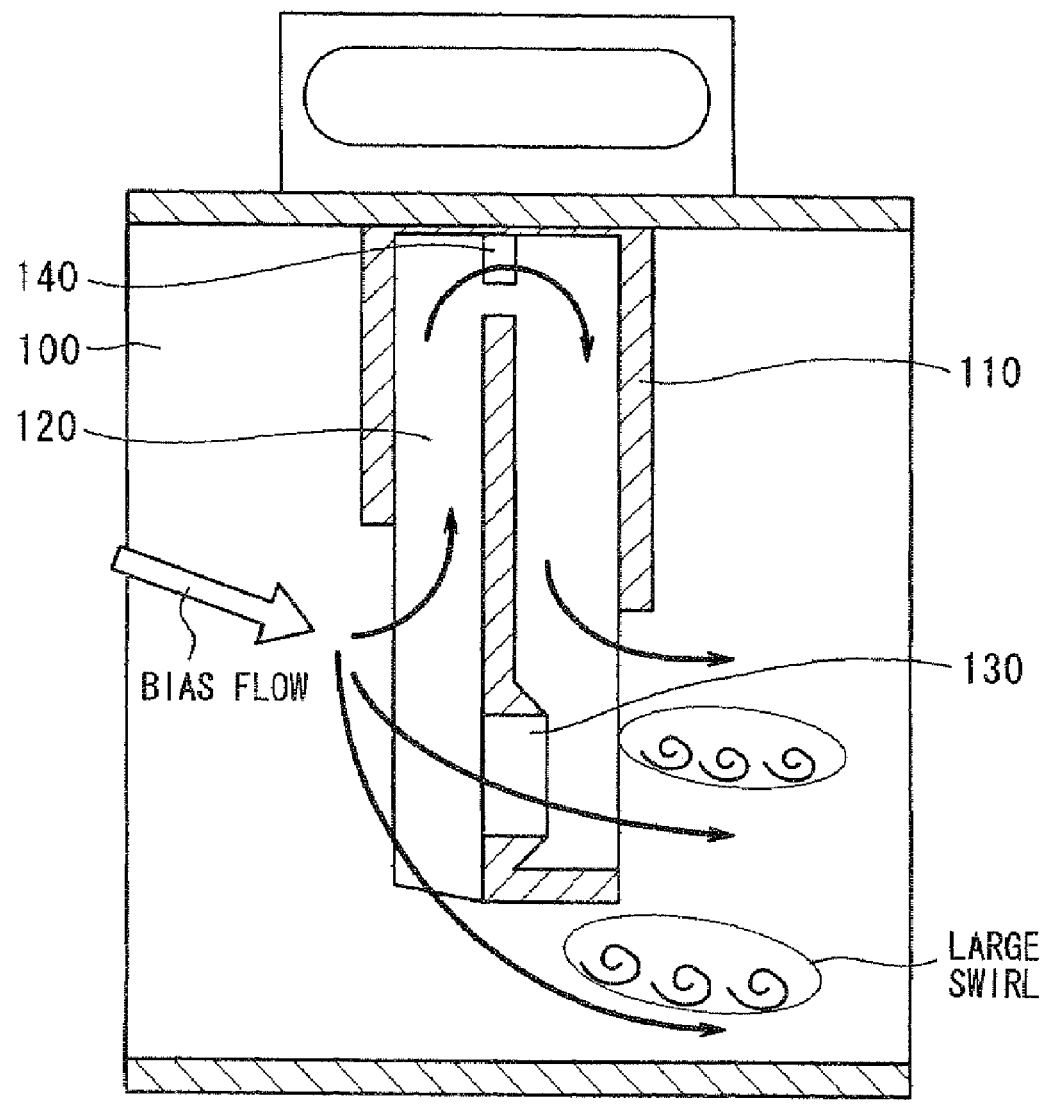
FIG. 7 is a cross sectional view showing an air flow measuring device in a prior art.

FIGS. 6A to 6C show examples of an air flow measuring device 1 according to a third embodiment of the present invention. In this embodiment, as shown in FIGS. 6A to 6C, the sub-bypass passage 7 described in the first embodiment is omitted, and only one bypass passage 6 is provided. Thus, in the third embodiment, a flow amount sensor 3 is located in the bypass passage 6 of the tube body 2a to detect a flow amount of air flowing in the bypass passage 6.

The tube body 2a is configured to define therein the bypass passage 6, as shown in FIGS. 6A to 6C. In the example of FIG. 6A, the first portion 6c of the tube body 2a is configured to have a convex curve surface in which the outer diameter of the tube body 2a is gradually increased by a predetermined ratio, and the second portion 6d positioned downstream from the first portion 6c in the tube body 2a has approximately a cylindrical shape, similarly to the tube body 2a of the above-described first embodiment. In the third embodiment, the tube body 2a is located in the air duct 5, similarly to the above-described first embodiment.

In the example of FIG. 6B, the first portion 6c of the tube body 2a is configured to have a convex curve surface in which the outer diameter of the tube body 2a is gradually increased by a ratio, and the second portion 6d' positioned downstream from the first portion 6c in the tube body 2a has a taper shape in which the outer diameter of the tube body 2a is gradually increased toward downstream.

In the example of FIG. 6C, the entire outer peripheral surface 6e of the tube body 2a is configured to have a convex curve surface in which the outer diameter of the tube body 2a is gradually increased toward downstream from the upstream end surface to the downstream end surface of the tube body 2a. In the examples of FIGS. 6B and 6C, the outer diameter of the tube body 2a on the downstream end surface becomes largest.

According to the third embodiment, the tube body 2a is formed into a shape, for example, a bullet shape, so that air flow resistance on the tube body 2a can be made smaller. Thus, even when a bias flow is caused due to a disturbance of an air flow on the upstream side of the tube body 2a, the air flowing along the outer peripheral surface of the tube body 2a is not greatly disturbed, thereby reducing a separation of an air flow from the tube body 2a and a generation of a large swirl around the tube body 2a. As a result, the flow speed of air in the bypass passage 6 can be made stable, and the detection accuracy of the flow amount sensor 3 can be improved.

In the third embodiment, the bypass passage 6 extends from the inlet 6a to the outlet 6b approximately cylindrically. Thus, the bypass passage 6 can be easily formed in the tube body 2a.

According to the examples of FIGS. 6A and 6B of the third embodiment, the air flow measuring device for measuring a flow amount of air flowing in an interior of a duct 5 includes the tube body 2a for defining the bypass passage 6 configured to introduce therein a part of air flowing in the duct 5, and the flow amount sensor 3 located in the bypass passage 6 to measure a flow amount of air flowing in the bypass passage 6. In the air flow measuring device, an upstream end surface of the tube body 2a has the inlet 6a of the bypass passage 6, open toward upstream in the duct 5, and a downstream end surface of the tube body 2a has the outlet 6b of the bypass passage 6, open toward downstream in the duct 5. The tube body 2a has the outer peripheral surface extending from the upstream end surface to the downstream end surface, and an outer diameter of the outer peripheral surface of the tube body 2a has the smallest dimension at the upstream end surface of the tube body 2a, and the largest dimension at the downstream end surface of the tube body 2a. In addition, the outer peripheral surface of the tube body 2a has the first portion 6c extending downstream from the upstream end surface in a predetermined range, and the first portion 6c of the outer peripheral surface is formed into a convex curve surface in which the outer diameter is increased by a ratio from a position on the upstream end surface, toward downstream. Accordingly, the pressure resistance of air on the first portion 6c of the tube body 2a can be made small, thereby restricting a large disturbance of air flowing along the outer peripheral surface of the tube body 2a and restricting a separation of air flow from the tube body 2a. As a result, a flow speed of air flowing in the bypass passage 6 can be made stable without greatly changing a pressure difference between the inlet 6a and the outlet 6b of the bypass passage 6. Therefore, in the air flow measuring device, detection accuracy of the flow amount sensor 3 can be improved.

As shown in FIGS. 6A and 6B, the outer peripheral surface of the tube body 2a may have the second portion 6d, 6d' extending from a downstream end of the first portion 6c to the downstream end surface of the tube body 2a. For example, in the example of FIG. 6B, the second portion 6d' of the outer peripheral surface of the tube body 2a is formed into a taper shape in which the outer diameter is increased approximately by a constant ratio as toward downstream. Alternatively, in the example of FIG. 6A, the second portion 6d of the outer peripheral surface of the tube body 2a has a cylindrical shape in which the outer diameter of the tube body 2a is substantially equal.

According to the example of FIG. 6C of the third embodiment, an air flow measuring device for measuring a flow amount of air flowing in an interior of the duct 5 includes the tube body 2a for defining the bypass passage 6 configured to introduce therein a part of air flowing in the duct 5, and the flow amount sensor 3 located in the bypass passage 6 to measure a flow amount of air flowing in the bypass passage 6. In the air flow measuring device, an upstream end surface of the tube body 2a has the inlet 6a of the bypass passage 6, open toward upstream in the duct 5, and a downstream end surface of the tube body 2a has the outlet 6b of the bypass passage 6, open toward downstream in the duct 5. The tube body 2a has the outer peripheral surface 6e extending entirely from the upstream end surface to the downstream end surface, and an outer diameter of the outer peripheral surface 6e of the tube body 2a has the smallest dimension at the upstream end surface of the tube body 2a, and the largest dimension at the downstream end surface of the tube body 2a. Furthermore, the outer peripheral surface 6e of the tube body 2a has a convex curve surface in which the outer diameter is increased by a ratio from the upstream end surface to the downstream end surface. Accordingly, in the air flow measuring device, detection accuracy of the flow amount sensor 3 can be improved.

Other Embodiments

Although the present invention has been fully described in connection with the preferred embodiments thereof with reference to the accompanying drawings, it is to be noted that various changes and modifications will become apparent to those skilled in the art.

For example, in the above-described first and second embodiments, the flow amount sensor 3 is located at the U-turning portion of the sub-bypass passage 7. However, the flow amount sensor 3 may be located at a position upstream from the U-turning portion in the sub-bypass passage 7, or may be located at other position in the sub-bypass passage 7.

Furthermore, in the above-described third embodiment, the shape of the bypass passage 6 provided in the tube body 2a may be suitably changed without being limited to the shape shown in FIGS. 6A to 6C.

Such changes and modifications are to be understood as being within the scope of the present invention as defined by the appended claims.

What is claimed is:

1. An air flow measuring device for measuring a flow amount of air flowing in an interior of a duct, the air flow measuring device comprising:
   a tube body for defining a bypass passage configured to introduce therein a part of air flowing in the duct;
   a sub-bypass passage branched from the bypass passage and being configured to introduce therein a part of air flowing in the bypass passage; and
   a flow amount sensor located in the sub-bypass passage to measure a flow amount of air flowing in the sub-bypass passage, wherein:
   an upstream end surface of the tube body has an inlet of the bypass passage, open toward upstream in the duct, and a downstream end surface of the tube body has an outlet of the bypass passage, open toward downstream in the duct;
   the tube body has an outer peripheral surface extending from the upstream end surface to the downstream end surface;
   an outer diameter of the outer peripheral surface of the tube body has a smallest dimension at the upstream end surface, and a largest dimension at the downstream end surface;
   the outer peripheral surface of the tube body has a first portion extending downstream from the upstream end surface in a predetermined range; and
   the first portion of the outer peripheral surface is a convex curve surface in which the outer diameter is increased by a ratio from a position on the upstream end surface toward downstream;
   further comprising:
   a throttle portion provided in the tube body at a position adjacent the outlet of the bypass passage to gradually reduce a passage sectional area of the bypass passage approaching the outlet of the bypass passage, wherein:
   the sub-bypass passage has an outlet around an outer periphery of the outlet of the bypass passage.

2. The air flow measuring device according to claim 1, wherein:
   the outer peripheral surface of the tube body has a second portion extending from a downstream end of the first portion to the downstream end surface of the tube body; and
   the second portion of the outer peripheral surface has a taper shape in which the outer diameter is increased approximately by a constant ratio toward downstream.

3. The air flow measuring device according to claim 1, wherein:
the outer peripheral surface of the tube body has a second portion extending from a downstream end of the first portion to the downstream end surface of the tube body; and
the second portion of the outer peripheral surface has a cylindrical shape in which the outer diameter is substantially equal.

4. The air flow measuring device according to claim 1, wherein:
the outlet of the sub-bypass passage is provided substantially concentrically with the outlet of the bypass passage.

5. The air flow measuring device according to claim 4, wherein the outlet of the sub-bypass passage is provided on the same surface as the downstream end surface of the tube body, where the outlet of the bypass passage is provided.

6. The air flow measuring device according to claim 1, wherein:
the duct is configured to define therein an intake air passage communicating with an intake air port of an internal combustion engine, such that the air flowing in the duct flows into the internal combustion engine.

7. The air flow measuring device according to claim 1, wherein the throttle portion has a taper shape in a flow direction of air in the bypass passage.

8. An air flow measuring device for measuring a flow amount of air flowing in an interior of a duct, the air flow measuring device comprising:
a tube body for defining a bypass passage configured to introduce therein a part of air flowing in the duct;
a sub-bypass passage branched from the bypass passage and being configured to introduce therein a part of air flowing in the bypass passage; and
a flow amount sensor located in the sub-bypass passage to measure a flow amount of air flowing in the sub-bypass passage, wherein:
an upstream end surface of the tube body has an inlet of the bypass passage, open toward upstream in the duct, and a downstream end surface of the tube body has an outlet of the bypass passage, open toward downstream in the duct;
the tube body has an outer peripheral surface extending from the upstream end surface to the downstream end surface;
an outer diameter of the outer peripheral surface of the tube body has a smallest dimension at the upstream end surface, and a largest dimension at the downstream end surface; and
the outer peripheral surface of the tube body has a convex curve surface in which the outer diameter is increased by a ratio from a position on the upstream end surface to a position on the downstream end surface;
further comprising:
a throttle portion provided in the tube body at a position adjacent the outlet of the bypass passage to gradually reduce a passage sectional area of the bypass passage approaching the outlet of the bypass passage, wherein:
the sub-bypass passage has an outlet around an outer periphery of the outlet of the bypass passage.

9. The air flow measuring device according to claim 8, wherein:
the outlet of the sub-bypass passage is provided substantially concentrically with the outlet of the bypass passage.

10. The air flow measuring device according to claim 9, wherein the outlet of the sub-bypass passage is provided on the same surface as the downstream end surface of the tube body, where the outlet of the bypass passage is provided.

11. The air flow measuring device according to claim 8, wherein the throttle portion has a taper shape in a flow direction of air in the bypass passage.

* * * * *